3,092,631
7-CHLORO-2-LOWER ALKYL-1,2,3,4-TETRA-HYDRO-4-OXOQUINAZOLINES

John Song, Bound Brook, N.J., and Elliott Cohen, Mount Vernon, N.Y., assignors to American Cyanamid Company, New York, N.Y., a corporation of Maine
No Drawing. Filed Jan. 18, 1961, Ser. No. 83,387
6 Claims. (Cl. 260—251)

This invention relates to new organic compounds and more particularly is concerned with the preparation of novel 7-chloro-2-lower alkyl-1,2,3,4-tetrahydro-4-oxo-quinazolines which may be represented by the following general formula:

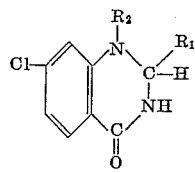

in which $R_1$ is lower alkyl and $R_2$ is hydrogen,

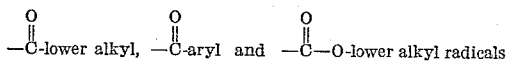

Suitable lower alkyl radicals contemplated by the present invention are those having up to four carbon atoms with methyl and ethyl being preferred. Aryl is exemplified by phenyl.

The new compounds of this invention have utility as muscle relaxants and as diuretics and may be administered orally or parenterally. They have exhibited diuretic activity at 5–10 mg./kg. and central nervous system depressant activity at 500–750 mg./kg.

A most important utility for the novel compounds is as intermediates in the preparation of 7-halo-6-sulfamyl-1,2,3,4-tetrahydro-4-oxoquinazolines which are useful diuretics and saluretics of considerable potency. These compounds are not claimed in this application as they form the subject matter of the copending application of Cohen and Vaughan, Serial No. 823,806, filed June 30, 1959 now Patent No. 2,976,289. These compounds have the following formula:

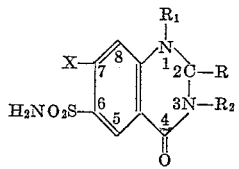

in which R is

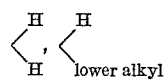

or oxo, $R_1$ is hydrogen or lower alkyl, $R_2$ is hydrogen or lower alkyl and X is halogen or trifluoromethyl.

The use of the novel compounds of the present invention as intermediates for producing the diuretics described in the Cohen and Vaughan application will be discussed in greater detail hereinafter.

The compounds of the present invention are very easily and simply prepared from 4-haloanthranilamides. It is only necessary to react them with a lower alkyl aldehyde or lower alkyl acetal. This reaction is effected in the presence of acids such as sulfuric acid, and preferably in an organic reaction medium such as an alkanol, ethers of glycols and the like. It is also an advantage that the reaction conditions are not critical and the reaction is quite rapid. The temperatures are moderate, for example, from about 30° C. to 130° C., optimum results being obtained at around 80° C. to 100° C. This permits a very simple temperature control. All that is necessary is to use an organic solvent, such as an alcohol, which boils at a temperature at which it is desired to run the reaction. The reaction can then be effected under reflux with automatic temperature control and very simple operating conditions.

The 4-haloanthranilamide may easily be obtained by a Sandmeyer reaction from a 4-halo-2-nitroaniline with cuprous cyanide, giving as an intermediate a 4-halo-2-nitrobenzonitrile which is reduced and hydrolyzed to the 4-haloanthranilamide.

As has been pointed out above, the compounds of the present invention may be prepared by reactions using either aldehydes or acetals. While both types of compounds can be used yields are better when acetals are used and, in fact, are nearly doubled. This is particularly true when the ethyl group is to be introduced.

When considering the usefulness of the compounds of the present invention as intermediates for the production of the 7-halo-6-sulfamyl-1,2,3,4-tetrahydro-4-oxoquinazolines therefrom it is of interest to compare the number of steps required and their nature, and particularly the number of steps starting from commercially available raw materials. The Cohen and Vaughan process described in the aforesaid application, and in the application of Cohen and Gadekar, Serial No. 850,113, filed November 2, 1959, now abandoned, starting with 5-chloroorthotoluidine, is illustrated schematically below and involves seven steps:

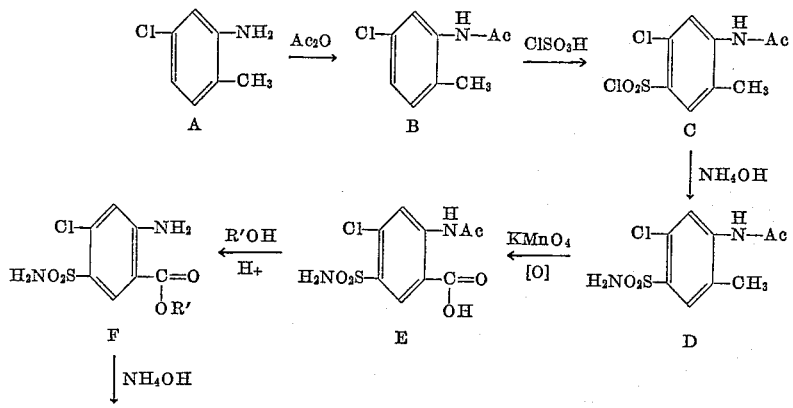

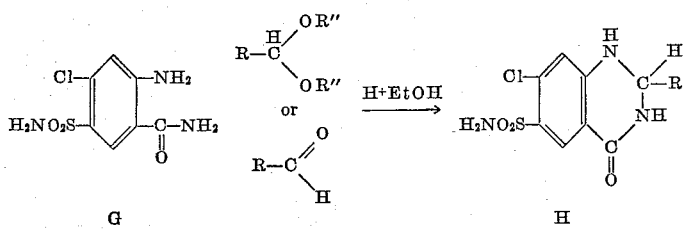

The new process of this invention involves only five steps to produce the final compound starting with commercially available materials as follows:

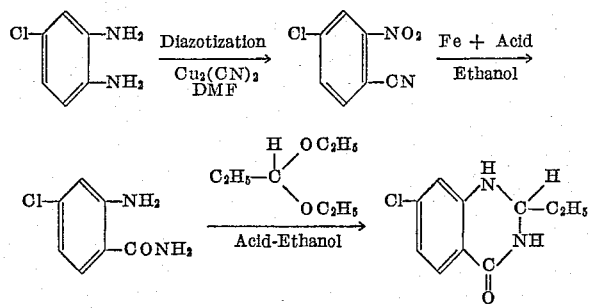

Two steps only are then needed from the intermediates of the present invention and this is represented by the following reaction scheme:

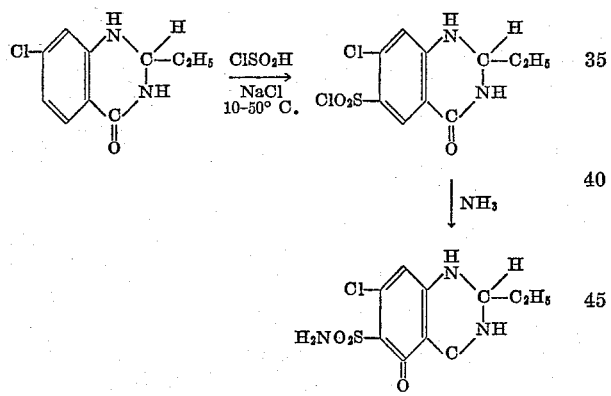

It will be seen overall that this route from commercially available materials and using the new intermediates of this invention eliminates two steps of the prior art process and represents a great saving.

The first step of the two-step process starting with the new intermediates also involves a new process improvement in the step itself. It has been found that the chlorosulfonation does not give useful yields unless there is present a fairly large amount of a halide salt which may be an alkali metal halide, alkaline earth metal halide, or the like. Because of its cheapness and excellent properties sodium chloride is greatly preferred. The presence of sodium chloride in the chlorosulfonation step is not to act as a catalyst. In other words, very small amounts of the salt will not give the good results. The salt has to be present in quite substantial amounts, approaching those of the other reactants.

While the operating conditions have not been conclusively established, useful yields of the desired compounds can be obtained using for one part of the quinazoline 3–10 parts by weight of chlorosulfonic acid, 0.5–4 parts of salt and 0.1–1 part of sodium metabisulfite. If desired, the sulfonylchloride can be purified by crystallization from a solvent such as methylene chloride and is then treated with ammonia to form the final product. The amidation step may be carried out with either aqueous ammonia or anhydrous ammonia at a temperature of from −80° C. to 30° C.

The temperature at which the chlorosulfonation is carried out is not critical and may vary from below room temperature or slightly above to 70 or 80° C. While the temperature is not critical it does have some effect and best yields are in general obtained between 10 and 50° C., which therefore may be considered as a preferred range, though not limiting the invention in a broader aspect.

As far as the nature of the salt used in the chlorosulfonation step the specific examples to follow will describe the use of sodium chloride but it should be understood that this choice is dictated by economic reasons, and good results are obtainable with other halide salts such as potassium chloride, calcium chloride and the like.

The invention will be described in greater detail in conjunction with the following specific examples in which the parts are by weight unless otherwise specified.

EXAMPLE 1

*Preparation of 7-Chloro-2-Ethyl-1,2,3,4-Tetrahydro-4-Oxoquinazoline*

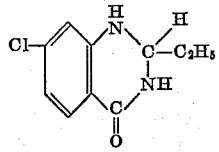

A mixture of 200 parts of methanol by volume, 4.7 parts of propionaldehyde, 9.8 parts of 4-chloroanthranilamide and 0.1 part of sulfuric acid was prepared. The mixture was heated at reflux for several hours until the reaction was complete and then was cooled and neutralized with 0.3 part of sodium bicarbonate and decolorized with 1 part of activated carbon. The filtrate was concentrated to a syrup and diluted with a very small volume of ethyl acetate. After complete cooling a crystalline product precipitated, which was removed by filtration and washed with a cold mixture of alcohol, ethyl acetate and petroleum ether. 3.7 grams of material was obtained. The yield was just over 30 percent. The material was then purified by recrystallization from ethyl acetate and gave a product melting at 130–132° C.

EXAMPLE 2

The compound of Example 1 was prepared by forming a mixture of 500 parts of anhydrous ethanol, 29 parts of 4-chloroanthranilamide, 33 parts of propionaldehyde diethylacetal and 0.15 part of concentrated sulfuric acid. The reaction mixture was then heated at reflux temperature, 80 to 81° C., for six hours. The bulk of the anhydrous alcohol and the unreacted acetal was then removed by vacuum distillation. After cooling there was obtained 76 percent of a product having a slightly better purity than that of Example 1. It will be noted that the use of the acetal instead of the aldehyde substantially doubled the yield and for this reason it is preferred.

EXAMPLE 3

*Preparation of 7-Chloro-2-Methyl-1,2,3,4-Tetrahydro-4 Oxoquinazoline*

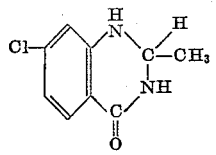

To 130 parts by volume of alcohol was added with stirring 9.44 parts of diethylacetal, 8.6 parts of 4-chloroanthranilamide and 0.09 part of concentrated sulfuric acid respectively. The mixture was heated at reflux for 4 hours, concentrated under reduced pressure to about 30 parts by volume and chilled to permit crystallization. The product was removed by filtration, washed with 20 parts by volume of cold alcohol, and air dried at 50° C. The first crop amounted to 3.3 g. An additional 3.2 grams of product was isolated from the mother liquor. The total yield was 6.2 grams (63.10% of theory) M.P. 140–3. The crude product was purified by recrystallization from ethyl acetate to give a product of M.P. 143°–147° C.

EXAMPLE 4

*Chlorosulfonation of the Product of Example 1 to the Quinazolinesulfonyl Chloride*

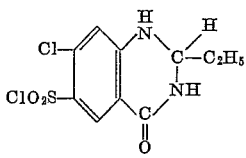

To a stirred mixture containing 46.5 parts of chlorosulfonic acid and 12 grams of the product of Example 1 was added portionwise 17.1 grams of sodium chloride over a period of 35 minutes while maintaining a temperature of 34 to 41° C. The mixture was then heated at a temperature of 41 to 44° C. for an additional period of 1½ hours. It was then drowned in 400 parts of an ice-water mixture maintaining a temperature of 0 to 4° C. The granular product which formed was removed by filtration, washed thoroughly with water and pressed to a moist cake. A 15-gram portion of the wet product was dried by removal of water by azeotropic distillation using methylene chloride, giving 1.5 grams (25.5%) of product having a melting point of 180° C. Treatment of this product with ammonia as described in Example 6, gave the desired sulfonamide.

A mixture consisting of 11.6 parts of chlorosulfonic acid and 4.0 parts of 7-chloro-2-ethyl-1,2,3,4-tetrahydro-4-oxoquinazoline but containing no sodium chloride was warmed for a period of 2 hours at a temperature of 40°–65° C. The melt was drowned in 75 parts of an ice-water mixture at a temperature of 2°–5° C. The product was collected by filtration, washed with three 100 milliliter portions of water, and dried overnight in a desiccator containing sulfonic acid under vacuo. The crude product amounted to 2.5 grams (42.7%). It was purified by trituration successively with a small volume of chloroform and ethyl acetate to yield 2.0 grams (34.3%) of product. When a sample of sulfonylchloride prepared in this maner was treated with ammonia, no 7-chloro-2-ethyl - 1,2,3,4 - tetrahydro - 4 - oxo - 6 - quinazolinesulfonamide was obtained.

EXAMPLE 5

46.5 parts of chlorosulfonic acid was cooled and treated with 1 part of sodium metabisulfite. 6.7 parts of 7-chloro-2-ethyl-1,2,3,4-tetrahydro-4-oxoquinazoline was slowly stirred into the resulting mixture while maintaining a temperature of 15°–25° C. It was warmed to 40° C. for a period of ⅓ hour and a mixture containing 17.1 parts of sodium chloride and 1 part of sodium metabisulfite was added in small portions over a period of ¾ hour at a temperature of 40–46° C. It was then heated for an additional 3 hours at that temperature and drowned into 250 parts of an ice-water mixture at a temperature of approximately 0° C. The product was collected on a filter, washed with three 250 milliliter portions of cold water and the water was removed by azeotropic distillation with methylene chloride followed by air drying at 45° C. to yield 4.7 grams (47.8%) of product, melting point 179° (dec.).

The product is purified by dissolving it in methylene chloride, clarifying the solution to remove insolubles concentrating it to near dryness before allowing the product to crystallize.

EXAMPLE 6

*Preparation of 7-Chloro - 2 - Ethyl-1,2,3,4-Tetrahydro-4-Oxo-6-Quinazolinesulfonamide*

A 1.4 part portion of purified 7-chloro-2-ethyl-1,2,3,4-tetrahydro-4-oxo-6-quinazolinesulfonyl chloride was added to 40 parts by volume of liquid ammonia and stirred for a period of 1 hour. The residual ammonia was removed under vacuo and the reaction mixture added to sufficient cold dilute acetic acid to obtain a pH of 5.92 while maintaining a temperature of 0° C. The product was collected on a filter, washed with water, and air dried at 100° C. The yield of material having a melting point 222–8° C. was 1.0 gram (76.4%). Purification from aqueous acetone produced material with a melting point of 232–235° C. The melting point of an authentic specimen prepared from 2-amino-4-chloro-5-sulfamylbenzamide was 234°–8° C. The melting point of a mixture of the two was 233°–238° C. The infrared spectrum of the purified product corresponded to that of the authentic specimen.

EXAMPLE 7

*Preparation of 7-Chloro-2-Ethyl-1,2,3,4-Tetrahydro-4-Oxo-6-Quinazolinesulfonamide*

4 parts of 7-chloro-2-ethyl-1,2,3,4-tetrahydro-4-oxo-6-quinazolinesulfonyl chloride was stirred into a mixture of 8 parts by volume of water and 125 parts by volume of liquid ammonia at a temperature of −38° C. to −45° C. The reaction was allowed to proceed at this temperature for 2 hours and the excess ammonia removed under vacuo to a volume of about 40 milliliters. This was added to cold dilute mineral acid solution and the final mixture brought to pH 5.4. The resulting product was collected on a filter, washed with water, and air dried at 50° to produce 2 grams of crude product (53.4%). This material was further purified from aqueous acetone to produce a product melting at 230–2° C. melting point of authentic specimen 230–2° C., mixture melting point 230–233° C. The infrared spectrum of the purified product was identical with that of an authentic specimen.

EXAMPLE 8

*Preparation of 1-Acetyl-7-Chloro-2-Ethyl-1,2,3,4-Tetrahydro-4-Oxoquinazoline*

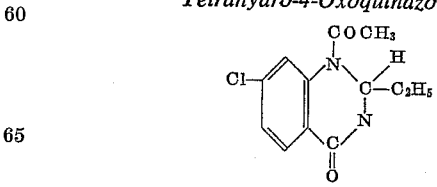

A mixture consisting of 5 grams of 7-chloro-2-ethyl-1,2,3,4-tetrahydro-4-oxoquinazoline, 10 grams of acetic anhydride and 0.1 gram of hydrochloric acid was heated to a temperature of about 98° over a period of one hour. It was then cooled to 90° C. and diluted with 75 grams of water. The product was collected on a filter, washed with water and air dried at 60° C. to yield 5.2 grams (87.5%) of crude product, M.P. 188°–198° C. It can be purified by recrystallization from a mixture containing 3 parts of dimethylformamide and 10 parts of water to yield a product that melts at 200–217° C.

We claim:
1. A compound of the formula:

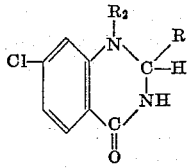

wherein $R_1$ is lower alkyl and $R_2$ is a member of the group consisting of hydrogen

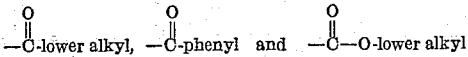

2. 7-chloro-2-ethyl-1,2,3,4-tetrahydro-4-oxoquinazoline.
3. 7-chloro-2-methyl-1,2,3,4-tetrahydro-4-oxoquinazoline.
4. 1-acetyl-7-chloro-2-ethyl-1,2,3,4-tetrahydro-4-oxoquinazoline.
5. 1-carbethoxy-7-chloro-2-ethyl-1,2,3,4-tetrahydro-4-oxoquinazoline.
6. 1-benzoyl-7-chloro-2-ethyl-1,2,3,4-tetrahydro-4-oxoquinazoline.

References Cited in the file of this patent
UNITED STATES PATENTS

| | | |
|---|---|---|
| 2,621,162 | Baker | Dec. 9, 1952 |
| 2,686,782 | Bartos | Aug. 17, 1952 |
| 2,893,993 | Dornfeld | July 7, 1959 |
| 2,952,680 | Novello | Sept. 13, 1960 |
| 2,969,362 | Tweit | Jan. 24, 1961 |

FOREIGN PATENTS

| | | |
|---|---|---|
| 843,073 | Great Britain | Aug. 4, 1960 |

OTHER REFERENCES

Elderfield: Heterocyclic Compounds, volume 6 (1957), pages 345–6.